US008887675B2

(12) United States Patent
Kogo et al.

(10) Patent No.: US 8,887,675 B2
(45) Date of Patent: Nov. 18, 2014

(54) CONTROL DEVICE FOR CHANGING PHASE OF MULTIPLE INDEPENDENT INTAKE VALVES IN ENGINE

(75) Inventors: Tomoyuki Kogo, Gotenba (JP); Takashi Ogawa, Susono (JP); Katsuhiro Ito, Mishima (JP); Kazuyasu Iwata, Fuji (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 243 days.

(21) Appl. No.: 13/574,154

(22) PCT Filed: Nov. 8, 2010

(86) PCT No.: PCT/JP2010/069860

§ 371 (c)(1), (2), (4) Date: Jul. 19, 2012

(87) PCT Pub. No.: WO2012/063314

PCT Pub. Date: May 18, 2012

(65) Prior Publication Data

US 2012/0290197 A1 Nov. 15, 2012

(51) Int. Cl.

| | |
|---|---|
| ***F01L 1/34*** | (2006.01) |
| ***F02D 13/02*** | (2006.01) |
| ***F01L 1/344*** | (2006.01) |
| ***F02D 41/00*** | (2006.01) |
| *F02B 29/04* | (2006.01) |
| *F02B 37/00* | (2006.01) |
| *F01L 1/047* | (2006.01) |

(52) U.S. Cl.

CPC ............. *F02D 13/0257* (2013.01); *F01L 1/344* (2013.01); *F02D 13/238* (2013.01); *F02D 41/0002* (2013.01); *F01L 2800/06* (2013.01); *F01L 2820/041* (2013.01); *F02B 29/0406* (2013.01); *F02B 37/00* (2013.01); *F02B 2275/14* (2013.01); *F02D 2041/002* (2013.01); *F02D 2250/38* (2013.01); *Y02T 10/123* (2013.01); *Y02T 10/42* (2013.01); *F01L 2001/0473* (2013.01); *Y02T 10/18* (2013.01)

USPC ......................... 123/90.15; 701/103; 123/347

(58) Field of Classification Search

CPC ............. F01L 2800/06; F02B 2275/14; F02D 13/0238; F02D 13/0257; F02D 2041/002; F02D 2250/38; F02D 41/002; F02D 41/12; F02D 41/0005; F02D 41/0007; F02D 13/02; Y02T 10/18; Y02T 10/42

USPC ............................ 123/90.15–90.18, 345–347

See application file for complete search history.

(56) References Cited

U.S. PATENT DOCUMENTS

| | | | | |
|---|---|---|---|---|
| 5,230,320 | A | 7/1993 | Hitomi et al. | |
| 6,484,677 | B2 * | 11/2002 | Leone et al. | 123/90.15 |

(Continued)

FOREIGN PATENT DOCUMENTS

| | | | |
|---|---|---|---|
| JP | 07-224626 | A | 8/1995 |
| JP | 09-170462 | A | 6/1997 |

(Continued)

OTHER PUBLICATIONS

International Search Report of PCT/JP2010/069860 dated Feb. 1, 2011.

*Primary Examiner* — Erick Solis
*Assistant Examiner* — Carl Staubach
(74) *Attorney, Agent, or Firm* — Sughrue Mion, PLLC

(57) ABSTRACT

A control device includes: a first phase changing portion retarding a first intake valve phase relative to a second intake valve phase; a throttle valve adjusting an intake air amount of the engine, and a control portion configured to perform an intake valve phase control which controls the first phase changing portion to retard the first intake valve phase relative to the second intake valve phase such that an air amount in the cylinder of the engine is reduced to a target value to perform rich combustion, and the control portion configured to perform a throttle valve closing control which controls the throttle valve such that the air amount in the cylinder is the target value or smaller after the air amount in the cylinder is not reduced to the target value or smaller by the intake valve phase control performed by the first phase changing portion.

11 Claims, 16 Drawing Sheets

RICH COMBUSTION CONTROL START
INTAKE VALVE PHASE CONTROL
S1
INTAKE AIR AMOUNT <INTAKE AIR AMOUNT TARGET VALUE IN CYLINDER?
S2
Yes
No
THROTTLE VALVE CLOSING CONTROL
S3
RICH COMBUSTION
S4
END

(56) References Cited

U.S. PATENT DOCUMENTS

| | | | | |
|---|---|---|---|---|
| 6,519,933 | B2 * | 2/2003 | Ogiso et al. | 60/285 |
| 7,779,796 | B2 * | 8/2010 | Nakamura | 123/90.15 |
| 7,810,460 | B2 * | 10/2010 | Ruiz | 123/90.17 |
| 8,511,266 | B2 * | 8/2013 | Fujioka | 123/90.15 |
| 8,538,662 | B2 * | 9/2013 | Murata | 701/103 |
| 2009/0084333 | A1 | 4/2009 | Cleary et al. | |

FOREIGN PATENT DOCUMENTS

| | | | |
|---|---|---|---|
| JP | 11-141375 | A | 5/1999 |
| JP | 2004-176544 | A | 6/2004 |
| JP | 2005-188356 | A | 7/2005 |
| JP | 2009-144521 | A | 7/2009 |
| JP | 2009-228640 | A | 10/2009 |
| JP | 2010-014122 | A | 1/2010 |
| JP | 2010-024865 | A | 2/2010 |

* cited by examiner

CONTROL DEVICE FOR CHANGING PHASE OF MULTIPLE INDEPENDENT INTAKE VALVES IN ENGINE

CROSS REFERENCE TO RELATED APPLICATIONS

This application is a National Stage of International Application No. PCT/JP2010/069860 filed Nov. 8, 2010, the contents of all of which are incorporated herein by reference in their entirety.

TECHNICAL FIELD

The present invention relates to a control apparatus of an engine.

BACKGROUND ART

Conventionally, a diesel throttle opening is reduced depending on rich spike in deceleration such that a pressure within a cylinder is controlled to be equal to or lower than a predetermined pressure corresponding to a temperature within the cylinder at an compression end (for example, see Patent Document 1). On the other hand, there is known a technique of differentiating the phases of two intake valves for enhancing the fluidity of the intake air within the cylinder to improve the combustion (for example, see Patent Document 2).

PRIOR ART DOCUMENT

Patent Document

[Patent Document 1] Japanese Patent Application Publication No. 2010-24865

[Patent Document 2] Japanese Patent Application Publication No. 2009-144521

SUMMARY OF THE INVENTION

Problems to be Solved by the Invention

However, even if such a control disclosed in Patent Document 1 is performed, a lean burn compression ignition engine (diesel type) may exhaust a large amount of smoke in a rich state. Further, in general, when an air amount is reduced by a diesel throttle arranged apart from the cylinder, gas transportation may be delayed by a volume from the diesel throttle to the cylinder to degrade the responsiveness. Furthermore, although the rich state having a good responsiveness is demanded in order to perform the rich combustion in the rich spike, the phase control of the intake valve disclosed in Patent Document 2 does not consider the rich combustion. Thus, there may be room for improvement to apply to the rich spike control.

It is therefore an object of an control apparatus of an engine herein to suppress generation of smoke and improve responsiveness of rich combustion.

Means for Solving the Problems

In order to achieve the above object, a control apparatus of an engine of a cylinder fuel injection type, the control apparatus includes: a first phase changing portion retarding a first intake valve phase relative to a second intake valve phase; and a control portion is configured to perform an intake valve phase control which controls the first phase changing portion to retard the first intake valve phase relative to the second intake valve phase such that an air amount in the cylinder of the engine is reduced to a target value to perform rich combustion.

The first intake valve phase retards to reduce an air amount remaining in the cylinder. A reduction in the air amount in the cylinder brings the cylinder in the rich state. Also, a reduction in the air amount in the cylinder reduces an effective compression ratio. This suppresses the generation of smoke. Also, a phase difference between the first and second intake valves generates a swirl flow in the cylinder. The swirl flow improves the combustion performance and suppresses the generation of smoke. In such a way, the phase control of the intake valve introduces air into the cylinder to improve the responsiveness of the rich combustion (rich spike). That is, since the intake valve having cyclic response introduces the air into the cylinder, the phase control of the intake valve controls the introduction of the air to contribute to the control performance and the responsiveness.

In order to achieve the above object, a control apparatus of an engine of a cylinder fuel injection type, the control apparatus includes: a first phase changing portion retarding a first intake valve phase relative to a second intake valve phase; a throttle valve adjusting an intake air amount of the engine, and a control portion configured to perform an intake valve phase control which controls the first phase changing portion to retard the first intake valve phase relative to the second intake valve phase such that an air amount in the cylinder of the engine is reduced to a target value to perform rich combustion, and the control portion configured to perform a throttle valve closing control which controls the throttle valve such that the air amount in the cylinder is the target value or smaller after the air amount in the cylinder is not reduced to the target value or smaller by the intake valve phase control performed by the first phase changing portion.

When the air amount has not been reduced to the target value or smaller by the intake valve phase control, the throttle valve initially controls the air amount. The throttle valve closing control has only to adjust the shortage of the air amount caused by the intake valve phase control. This minimizes the influence of the gas transportation delay from the throttle valve into the cylinder on the responsiveness. To perform the inlet valve phase control before to perform the throttle valve closing control produces following effects. Firstly, swirl flow promotes the dispersion of the fuel spray to reduce the fuel adhesion on a cylinder bore wall and to reduce oil dilution. A reduction in the effective compression ratio reduces the exhaust temperature in addition to the combustion temperature. Thus, there is room for extending the rich combustion duration. This reduces the catalyst control period and improves the fuel consumption. Further, the throttle valve closing control is minimized to keep a high pressure on the downstream side of the throttle valve. This results in an improvement in control performance of Exhaust Gas Recirculation (EGR). Also, the throttle valve closing control may be associated with an increase in pump loss to reduce torque and to greatly influence drivability. Further, since it is difficult to estimate how much the pump loss is increasing, thereby making it difficult to improve the drivability. In contrast, the inlet valve phase control opens an intake port and retards the closing timing of the intake valve to reduce the air amount in the cylinder. This suppresses the influence on the pump loss. This results in an improvement in the torque step to alleviate the influence on the drivability.

The control apparatus of the engine herein may further include a second phase changing portion changing the second intake valve phase, wherein the control portion may be configured to perform an advance control which controls the second phase changing portion to advance the second intake valve, and in addition, performs a retard control which controls the first phase changing portion to advance the first intake valve.

The phase difference between the intake valves can be increased to strengthen the swirl flow. This results in further suppressing the generation of smoke.

Herein, the control portion may be configured to further advance the second intake valve as an intake air amount is smaller. The intake air has a smaller inertia force as the intake air amount is smaller. Therefore, this is in order to enlarge the phase difference between the first and second intake valves to strengthen the swirl flow.

The control portion may be configured to suppress the throttle valve closing control, when an exhaust pressure is a predetermined value or higher. The throttle valve closing control is suppressed to maintain the high pressure on the downstream of the throttle valve. This is in order to maintain the high pressure in an intake pipe to such an extent that an accidental fire does not occur, and to maintain a small difference between the exhaust and intake pressures to ensure the EGR controllability.

The control portion may be configured to increase the throttle valve opening as an exhaust pressure of the engine is higher. When the exhaust pressure is high, the throttle valve opening is increased to maintain the high pressure in the intake pipe on the downstream of the throttle valve. This is in order to ensure the EGR controllability, as mentioned above.

The control portion may be configured to suppress the throttle valve closing control, when the engine is in a high rotational and high load state. This is in order to suppress the throttle valve closing control and to suppress the drivability degradation, in a driving state where the throttle valve closing control may degrade the drivability in reducing the torque.

The control portion may be configured to increase the throttle valve opening as a rotational number and a load of the engine are higher. This is in order to suppress the drivability degradation caused by the throttle valve closing control, as mentioned above.

In the control apparatus of the engine herein, the control portion may be configured to further retard the first intake valve phase as an exhaust temperature is higher. The control portion increases the retard amount to such an extent that an accidental fire does not occur to reduce the exhaust temperature. This is in order to extend the rich combustion duration to reduce the catalyst control period and to improve the fuel consumption. In particular, in a case where a supercharger is provided, the temperature may be limited in order to protect the supercharger, but a reduction in the exhaust temperature can extend the rich combustion duration.

The control apparatus of the engine herein may further include a supercharger, wherein the control portion may be configured to further retard the first intake valve phase, when a charging pressure of the supercharger is higher than a target charging pressure. When the charging pressure (actual charging pressure) is higher than the target charging pressure, an increase in the retard amount reduces the air amount in the cylinder. Such a control has an advantage of the controllability, the responsiveness, and the pump loss, as compared to a case where the throttle valve adjusts the air amount.

The control apparatus of the engine herein may further include a third phase changing portion changing an exhaust valve phase, wherein the control portion may be configured to control the third phase changing portion to further retard the exhaust valve as an exhaust temperature is higher. This is in order to reduce the exhaust loss and to reduce a workload of the supercharger to suppress an increase in the charging pressure.

The control portion may be configured to increase the throttle valve opening, and then advance the retarded first intake valve, when finishing the rich combustion. In a case of returning the first intake valve which has retarded to make the rich combustion state, that is, in a case of advancing the first intake valve, the first intake valve advances after the throttle valve opening degree increases. If the throttle valve opening degree increases after the first intake valve advances, the gas amount may drastically increase just after the first intake valve advances, and then choke may occur. The choke is suppressed, whereby the pump loss, the fuel consumption degradation, and the drivability degradation are suppressed.

The control portion may be configured to increase the throttle valve opening, and then retard the advanced second intake valve, when finishing the rich combustion. This control is assumed that the rich combustion is caused by retarding the first intake valve and advancing the second intake valve. The second intake valve retards, just as the first intake valve advances after the throttle valve opening degree increases as mentioned above. This suppresses the choke, the pump loss, the fuel consumption, and the drivability degradation.

Effects of the Invention

According to an control apparatus of an engine herein, it is possible to suppress generation of smoke and improve responsiveness of rich combustion.

MODES FOR CARRYING OUT THE INVENTION

Figure 1:
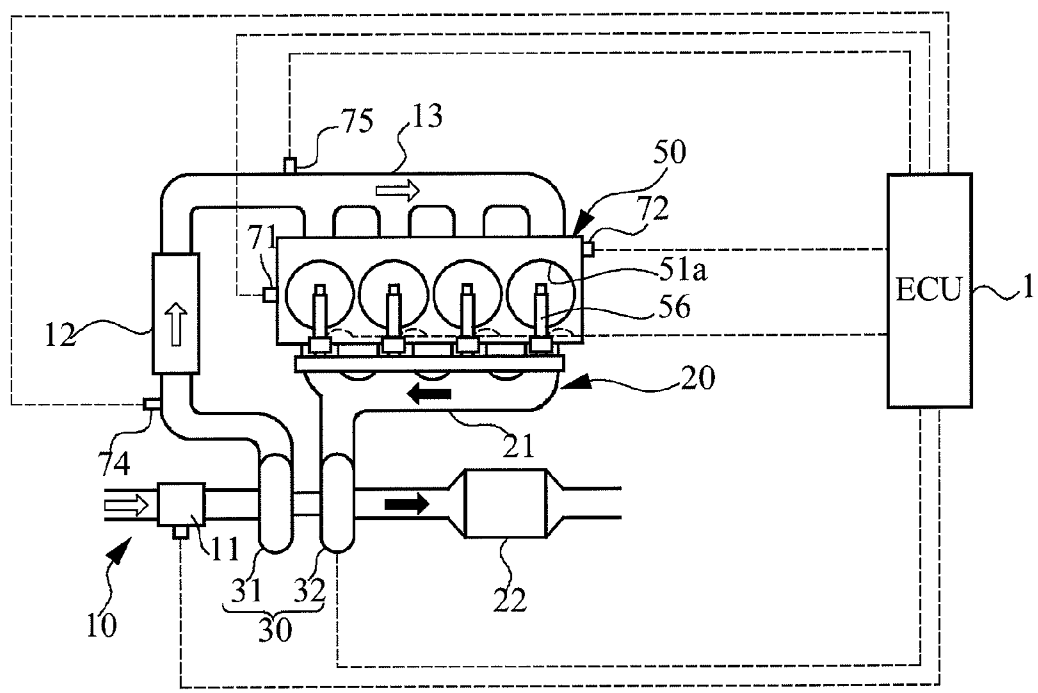
FIG. 1 is a general configuration view of an engine into which a control apparatus of an engine of an embodiment is installed.

The embodiment according to the present invention will be described below with reference to the accompanying drawings. Herein, a ratio and a dimension of each component illustrated in the drawings may not correspond to the actual ones. Also, in some cases, details may be omitted in the drawings.

First Embodiment

FIG. 1 is a general configuration view of an engine into which a control apparatus of an engine 50 of an embodiment is installed. The engine 50 according to the present embodiment is a compression ignition type of a diesel engine, but it may be a cylinder fuel injection type of a gasoline engine.

As illustrated in FIG. 1, an intake system 10 includes: an airflow meter (A/C) 11; an intercooler (I/C) 12; and an intake manifold 13. The airflow meter 11 measures an intake air amount. The intercooler 12 cools the air compressed by a supercharger 30. The intake manifold 13 distributes the air to each cylinder 51*a* of the engine 50.

An exhaust system 20 includes an exhaust manifold 21 and a catalyst 22. The exhaust manifold 21 joins each cylinder 51*a* to an exhaust path at the downstream side. The catalyst 22 purifies exhaust gas. The supercharger 30 includes a compressor portion 31 and a turbine portion 32. The supercharger 30 is a variable geometry turbocharger driven by the exhaust gas. The compressor portion 31 and the turbine portion are respectively provided to an intake system 10 and the exhaust system 20.

Figure 2:
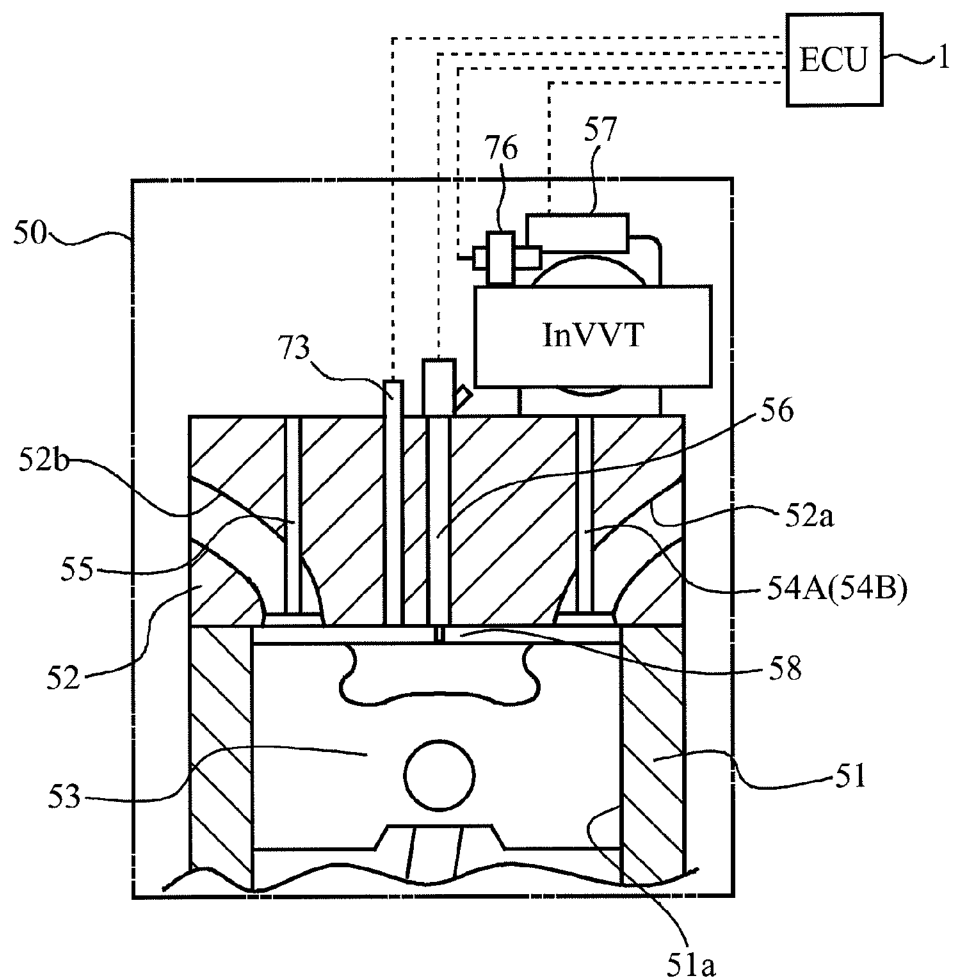
FIG. 2 is a schematic configuration view of the engine of the embodiment.

As illustrated in FIG. 2, the engine 50 includes a cylinder block 51, a cylinder head 52, a piston 53, a first intake valve 54A, a second intake valve 54B, exhaust valves 55, a fuel injection valve 56, and an intake Variable Valve Timing (VVT) 57. The intake VVT 57 is an example of a first phase changing portion, as will be described later in detail, which retards the phase of the first intake valve 54A relative to the phase of the second intake valve 54B.

The cylinder 51*a* is formed in the cylinder block 51. A piston 53 is housed in the cylinder 51*a*. The cylinder head 52 is fixed on the upper surface of the cylinder block 51. A combustion chamber 58 is a space surrounded by the cylinder block 51, the cylinder head 52, and the piston 53.

An intake port 52*a* and an exhaust port 52*b* are formed in the cylinder head 52. The intake port 52*a* introduces the intake air to the combustion chamber 58. The exhaust port 52*b* exhausts the gas from the combustion chamber 58. Further, the first intake valve 54A and a second intake valve 54B, and exhaust valves 55 are provided in the cylinder head 52. The first intake valve 54A and the second intake valve 54B open and close the intake port 52*a*. The exhaust valves 55 open and close the exhaust port 52*b*.

Figure 3:
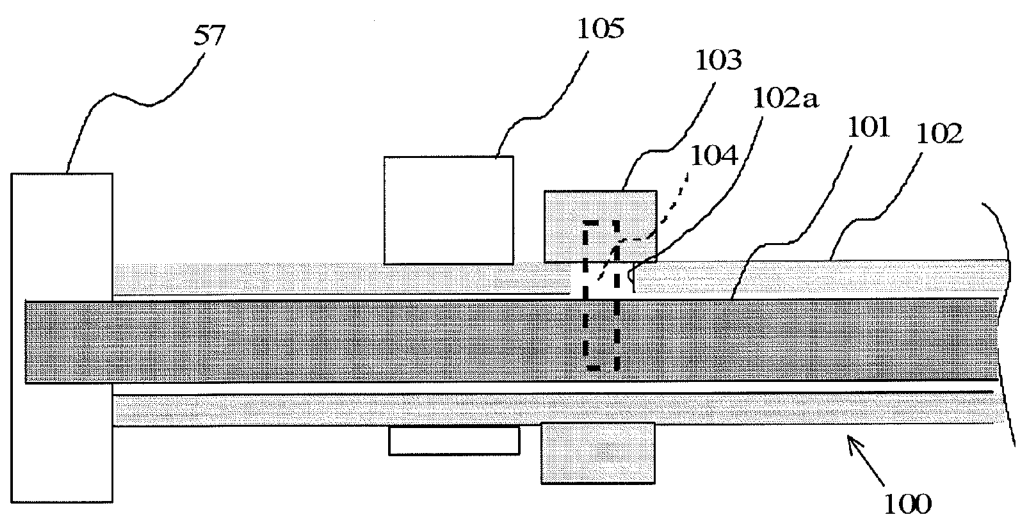
FIG. 3 is an explanatory view of an example of an intake camshaft.

FIG. 3 is an explanatory view of an intake camshaft 100 for driving the first intake valve 54A and the second intake valve 54B. The intake camshaft 100 has a dual cam structure where an inner shaft 101 is rotatably fitted into an outer shaft 102. A first cam 103 is fixed on the inner shaft 101 by a fixing pin 104. The first cam 103 is exposed to the outside from a slot 102*a* provided in the outer shaft 102. The inner shaft 101 is rotated relative to the outer shaft 102 to change the phase of the first cam 103. A second cam 105 is press-fitted into and fixed to the outer shaft 102. The first cam 103 drives the first intake valve 54A. The second cam 105 drives the second intake valve 54B.

Figure 4:
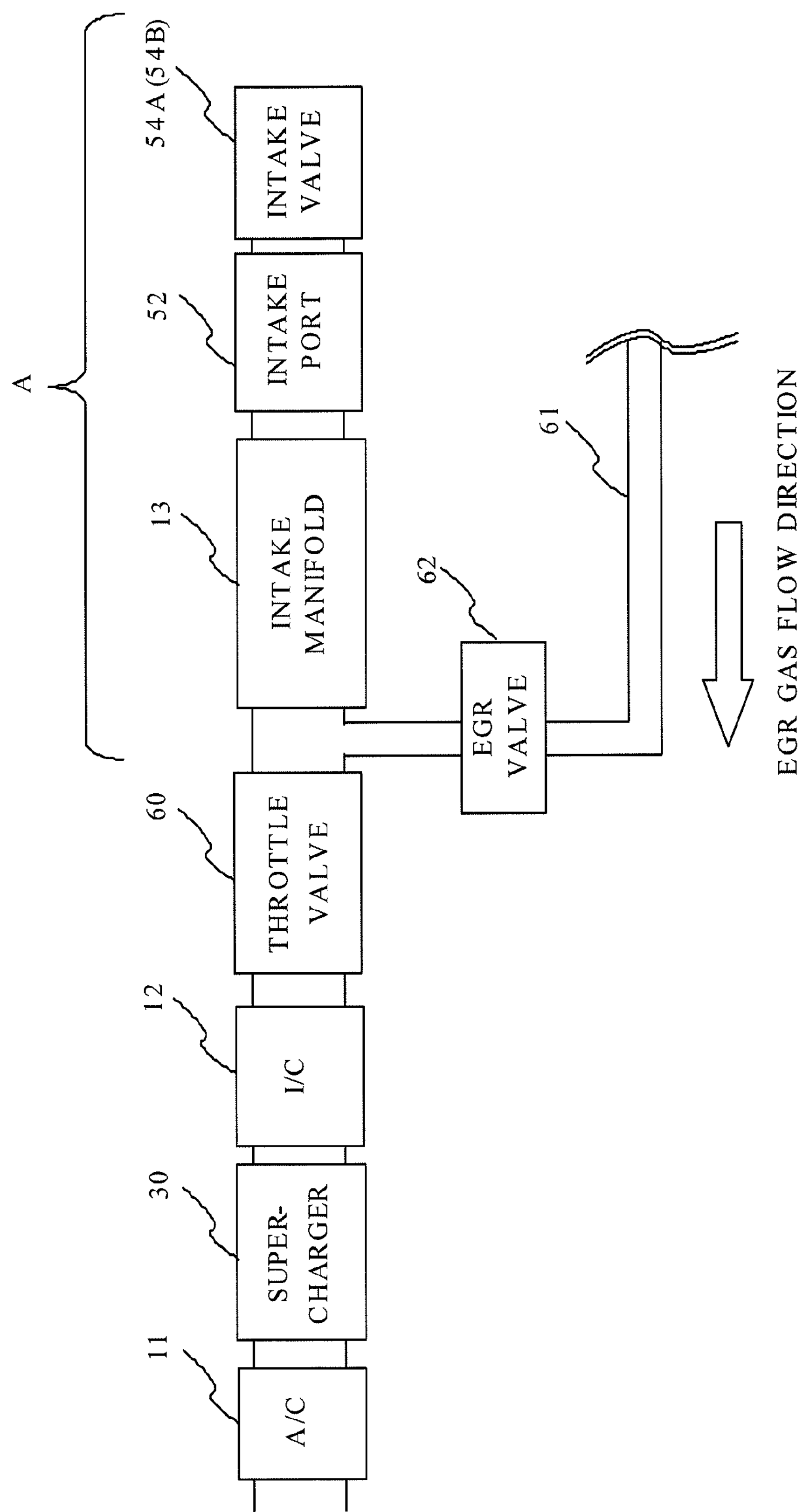
FIG. 4 is a block view illustrating an example of an intake system of the engine in detail.

FIG. 4 is a block view illustrating an example of the intake system 10 of the engine 50 in detail. In the intake system 10, the airflow meter 11, the supercharger 30, the intercooler 12, a throttle valve 60, the intake manifold 13, the intake port 52*a* are arranged in this order in the air flow direction. Additionally, the air is introduced into the cylinder 51*a* by the intake valve 54A (54B) driven by the intake VVT 57. The throttle valve 60 adjusts an intake air amount. An EGR pipe 61 is connected between the throttle valve 60 and the intake manifold 13, that is, on the downstream of the throttle valve 60. An EGR valve 62 is arranged in the EGR pipe 61. Additionally, when the opening degree of the throttle valve 60 is reduced by a closing control, a negative pressure is generated in an area indicated by a reference A which is on the downstream side of the throttle valve 60. In contrast, a high pressure is generated due to the exhaust gas on the upstream side of the EGR valve 62 of the EGR pipe 61. The EGR valve 62 opens or closes in response to the pressure difference between the upstream and downstream sides.

Figure 5:
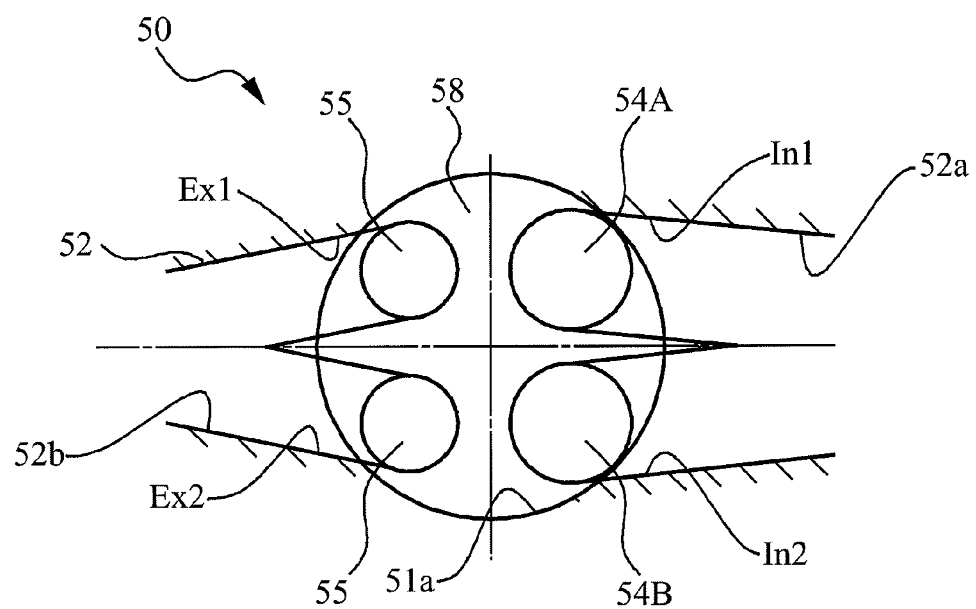
FIG. 5 is an explanatory view of an example of arrangements of intake and exhaust valves of the engine.

As illustrated in FIG. 5, specifically, the intake port 52*a* includes partial intake ports In1 and In2 which are divergent and opened from the upstream side to the combustion chamber 58. The exhaust port 52*b* includes partial exhaust ports Ex1 and Ex2 which are divergent and opened from the downstream side to the combustion chamber 58. Also, the first intake valve 54A opens and closes the partial intake port In1, the second the intake valve 54B opens and closes the partial inlet port In2, and two exhaust valves 55 respectively open and close the partial exhaust ports Ex1 and Ex2.

A flow coefficient of the partial intake port In1 is smaller than that of the partial intake port In2. Specifically, a flow cross-section area of the partial intake port In1 is smaller than that of the partial intake port In2. Thus, a valve diameter of the first intake valve 54A is smaller than that of the second intake valve 54B. As will be described later, the air is introduced preferentially through the second intake valve 54B to the cylinder 51*a*, when the first intake valve 54A retards relative to the second intake valve 54B. The timings when the air is introduced to the cylinder 51*a* are differentiated in such a way, thereby generating the swirl flow. Further, the retarded first intake valve 54A is arranged at the partial intake port In1 having a small flow coefficient, thereby increasing the difference between the introduction of the air to the cylinder 51*a*. This strengthens the swirl flow. To strengthen the swirl flow is effective for a reduction in smoke.

As illustrated in FIG. 2, the fuel injection valve 56 is provided in the cylinder head 52. The fuel injection valve 56 injects the fuel directly into the cylinder. Also, the intake VVT 57 is provided in the cylinder head 52. The intake VVT 57 is adopted to change a closing timing of the first intake valve 54A, selected from the first intake valve 54A and the second intake valve 54B. That is, the intake VVT 57 changes a phase of the inner shaft 101 illustrated in FIG. 3.

Various sensors are provided in the engine 50. Specifically, the airflow meter 11, a crank angle sensor 71 for detecting a crank angle or an engine rotational number NE, a water temperature sensor 72 for detecting a cooling water temperature of the engine 50, and a cylinder inner pressure sensor 73 for detecting a cylinder inner pressure P0 are provided. Further, the intake system 10 is provided with a charging pressure sensor 74 for detecting a charging pressure P, and a temperature sensor 75 for detecting an intake temperature P0'. Furthermore, the intake VVT 57 is provided with a valve timing sensor 76 for detecting a valve timing.

The ECU 1 is an electronic control device corresponding to a control portion, and includes: a microcomputer including a CPU, a ROM, a RAM, and the like; and an input-output circuit. The ECU 1 is electrically connected with various sensors and switches such as the above airflow meter 11 and the sensors 71 to 76. Also, the ECU 1 is electrically connected with various controlled objects such as the supercharger 30, the fuel injection valve 56, and the intake VVT 57.

The ROM stores programs and map data describing various processes performed by the CPU. The CPU performs processes while utilizing a temporal memory area of the RAM if necessary on the basis of the programs stored in the ROM. This functionally achieves a control portion, a control portion, a determination portion, a detection portion, and the like in the ECU 1.

An ECU 1 performs an intake valve phase control which controls the intake VVT 57 to retard the phase of the first intake valve 54A relative to the phase of the second intake valve 54B such that an air amount in the cylinder of the engine 50 is reduced to a target value to perform the rich combustion. When the air amount in the cylinder 51*a* is not reduced to the target value or smaller by the intake valve phase control by the intake VVT 57, the ECU 1 performs a following control. That is, a throttle valve closing control is performed to control the throttle valve such that the air amount in the cylinder is the target value or smaller, subsequently after the intake valve phase control.

Figure 6:
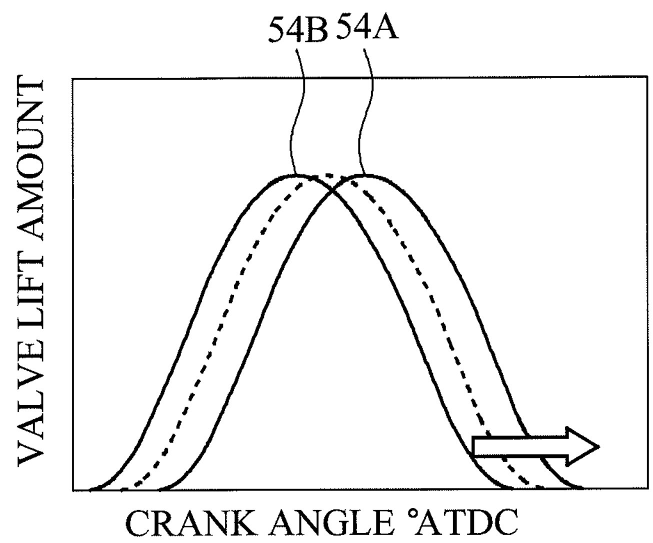
FIG. 6 is a view a change in the intake valve phase.

The ECU 1 performs the intake valve phase control which retards the closing timing of the first intake valve 54A, selected from the first intake valve 54A and the second intake valve 54B. Specifically, as illustrated in FIG. 6, the opening timing and the closing timing of the first intake valve 54A are integrally changed with the valve timing of the second intake valve 54B fixed, thereby retarding the closing timing of the first intake valve 54A. This retards the closing timing of the first intake valve 54A relative to the second intake valve 54B. The ECU 1 performs the control retarding the closing timing of the first intake valve 54A in the intake VVT 57 as the controlled abject. Herein, the retard control performed by the ECU 1 means that the closing timing of the first intake valve 54A retards. Thus, the closing timing of the first intake valve 54A retards relative to the intake bottom dead center timing.

The ECU 1 recognizes information from various sensors 71 to 76, and the intake air amount, the exhaust pressure, the engine rotational number, the engine load, the exhaust temperature, and the charging pressure in the basis of the information from the various sensors 71 to 76. Also, the ECU 1 recognizes the target value of the air amount in the cylinder for making the rich combustion.

Figure 7:
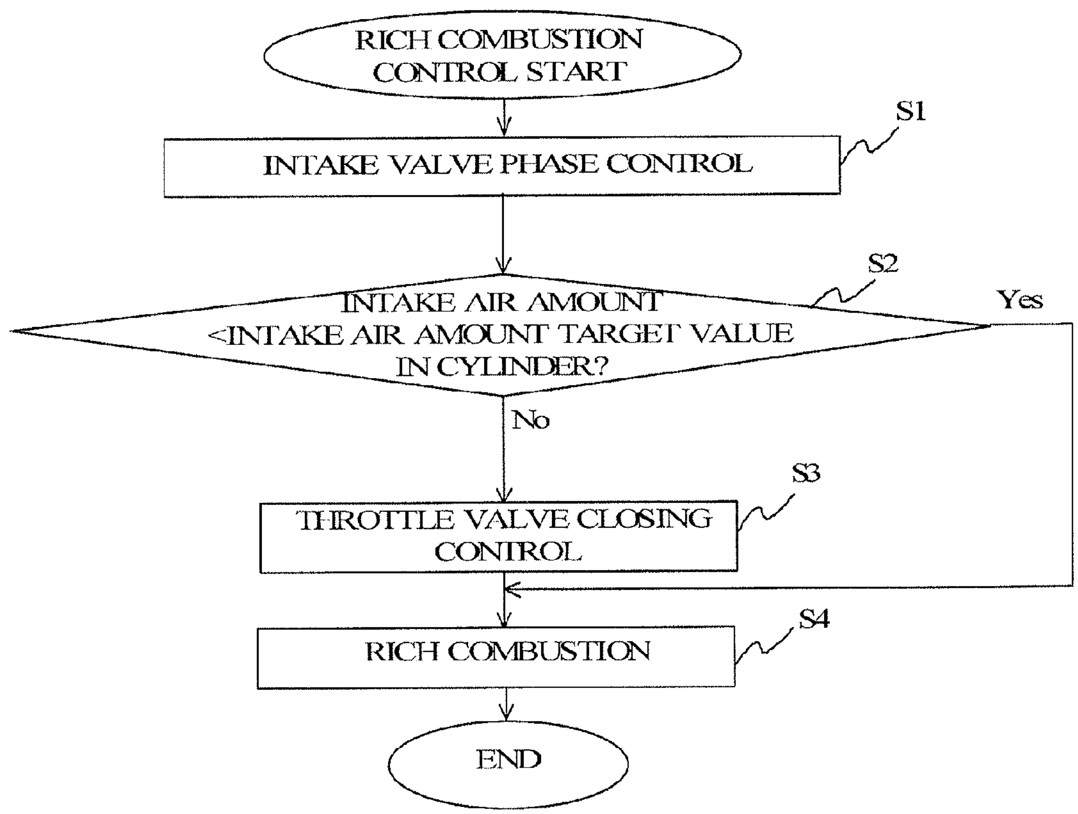
FIG. 7 is a flowchart of a control performed by the control apparatus of the engine.

Next, a description will be given of an example of a control performed by the control apparatus in such an engine 50. FIG. 7 is a flowchart of a control (rich combustion control) performed by the control apparatus of the engine. The ECU 1 mainly performs this control.

Firstly, the intake valve phase control is performed in step S1. Specifically, the ECU 1 instructs the intake VVT 57 to perform the retard control of the first the intake valve 54A. The retard control of the first intake valve 54A is performed, whereby the second intake valve 54B introduces air before the first intake valve 54A. This results in generating the swirl flow. The generation of the swirl flow improves the combustion and suppresses the generation of smoke. Also, the first intake valve 54A arranged near the cylinder 51*a* is controlled to ensure good responsiveness. Suppose the throttle valve 60 is initially controlled, the air amount is adjusted without considering a movement of the piston 53, or a timing of the combustion. In contrast, the intake valve phase control is initially performed to adjust the air amount in a cyclic manner.

In step S2 subsequent to step S1, it is determined whether or not the intake valve phase control in step S1 causes the air amount to be smaller than the target air amount in the cylinder 51*a*. When Yes is determined in step S2, the process proceeds to step S4. In step S4, specifications of the fuel injection is changed to perform the rich combustion.

In contrast, when No is determined in step S2, the process proceeds to step S3. In step S3, the closing control of the throttle valve 60 is performed. That is, only when the air amount is not reduced to the target value or smaller by the intake valve phase control, the throttle valve 60 initially controls the air amount. The closing control of the throttle valve 60 adjusts the shortage of the air amount caused by the intake valve phase control. This minimizes the influence of the gas transportation delay from the throttle valve 60 into the cylinder 51*a* on the responsiveness. The process proceeds to step S4 after step S3. That is, the rich combustion is performed.

In such a way, the intake valve phase control performed before the throttle valve closing control produces the following effects. Firstly, the swirl flow promotes the dispersion of the fuel spray. This reduces the fuel adhesion on a cylinder bore wall and reduces the oil dilution. At the time of the rich combustion, the air amount in the cylinder 51*a* decreases. That is, a reduction in the density of the gas in the cylinder 51*a* increases the penetration force of the fuel spray. This results in that the fuel tends to be adhesive on the cylinder bore wall and the oil dilution tends to occur. In view of such a situation, the intake valve phase control is performed before the throttle valve closing control, whereby the swirl flow promotes the dispersion of the fuel spray. Accordingly, this suppresses the fuel adhesion on the cylinder bore wall and suppresses the oil dilution.

Also, a reduction in the effective compression ratio reduces the exhaust temperature in addition to the combustion temperature. It is therefore possible to extend the rich combustion duration. This reduces the catalyst control period and improves the fuel consumption. That is, the rich combustion increases the exhaust temperature. For this reason, in particular, in a case where the supercharger is provided, the temperature may be limited in order to protect the supercharger. Even in this case, a reduction in the exhaust temperature allows continuation of the rich combustion.

Further, the throttle valve closing control is minimized to keep a high pressure on the downstream side of the throttle valve (in particular, the area indicated by A in FIG. 4). This results in an improvement in the EGR controllability. That is, the EGR valve 62 opens or closes in response to the pressure difference between the upstream and downstream sides. Thus, a reduction in the opening degree of the throttle valve 60 reduces the pressure in the area A illustrated in FIG. 4 to enlarge the pressure difference between the upstream and downstream sides of the EGR valve 62. This degrades the controllability. That is, when the EGR valve 62 merely opens slightly, a large amount of the EGR gas is introduced to degrade the EGR controllability. In degrading the EGR controllability, the EGR gas tends to be excessive or short. This may degrade the emission. The intake valve phase control is performed before the throttle valve closing control, thereby improving the controllability in the rich combustion state or returning from the rich combustion state.

Further, the throttle valve closing control may be associated with the pump loss to reduce the torque and to degrade the drivability. Further, it is difficult to estimate how much the pump loss is increasing, so it is difficult to improve the drivability. In contrast, the inlet valve phase control opens the intake port 52*a* and retards the closing timing of the first intake valve 54A to reduce the air amount in the cylinder. This suppresses the degradation of the pump loss. This results in suppressing the drivability degradation.

To perform the intake valve phase control, and to perform the intake valve phase control before to perform the throttle valve closing control in such a way produce the various effects.

Herein, a description will be given of various matters to be considered in step S1. Additionally, these matters will be individually described for convenience of description, but a control may be performed in consideration of plural matters at the same time.

(Exhaust Temperature)

Figure 8:
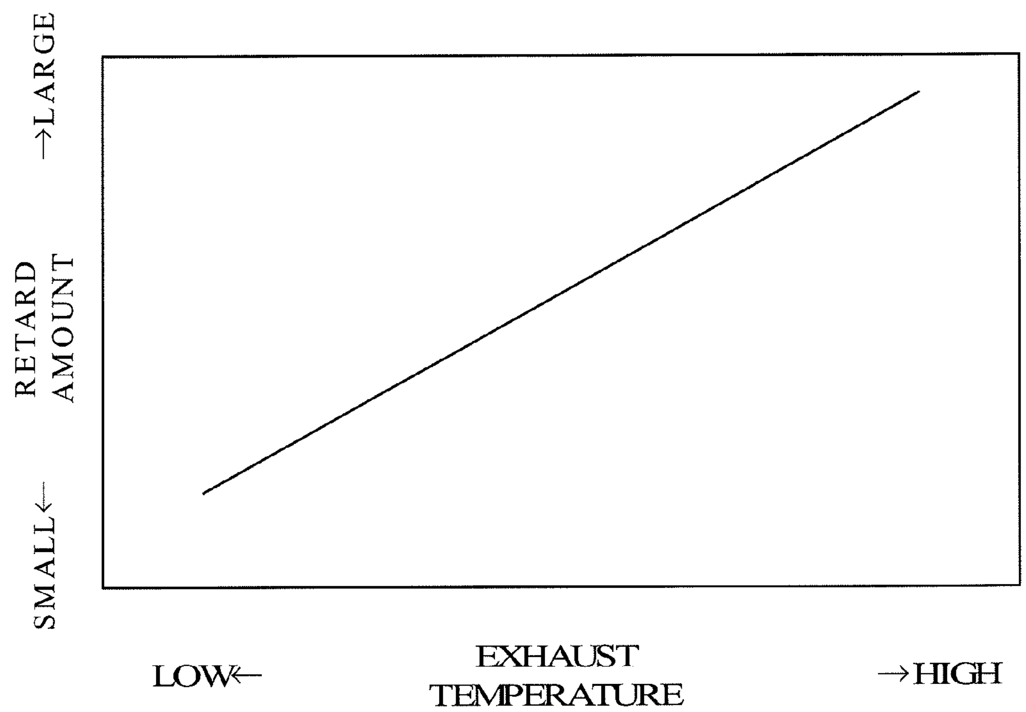
FIG. 8 is an example of a map defining a relationship between a exhaust temperature and a retard amount of the intake valve.

The ECU 1 can consider the exhaust temperature of the engine 50 in step S1. FIG. 8 is an example of a map defining a relationship between an exhaust temperature and a retard amount of the intake valve. When the exhaust temperature is made too high too much by the rich combustion, it is not preferable to continue the rich combustion. In particular, when the supercharger 30 is provided, there may a limitation in light of the protection of the supercharger 30. For this reason, the phase retard amount of the first intake valve 54A increases as an exhaust temperature is higher. This reduces the effective compression ratio, and then reduces the exhaust temperature. It is therefore possible to protect the supercharger 30. Thus, the exhaust temperature is controlled to such an extent to protect the supercharger 30, thereby continuing the rich combustion duration and protecting the supercharger 30. This reduces the catalyst control period and improves the fuel consumption.

(Charging Pressure)

Figure 9:
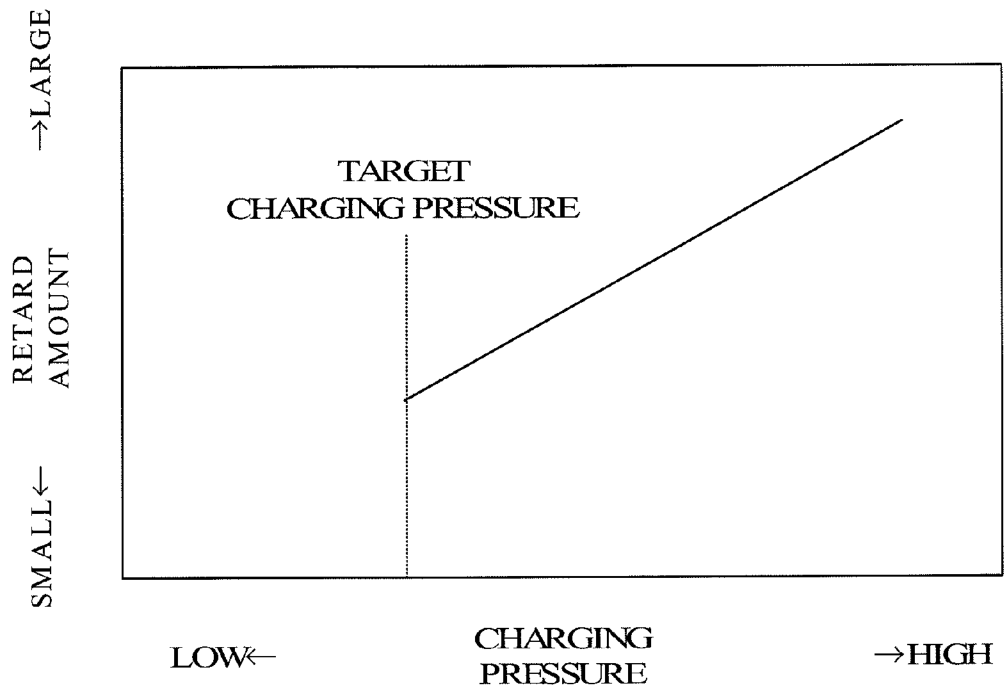
FIG. 9 is an example of a map defining a relationship between a charging pressure and the retard amount of the intake valve.

The ECU 1 can consider the charging pressure in the engine 50 in step S1. FIG. 9 is an example of a map defining a relationship between the charging pressure and the retard amount of the intake valve. A change in the charging pressure is associated with a response delay due to so-called turbo rag. Therefore, the actual charging pressure may be higher than the target charging pressure even if the charging pressure is controlled. When the actual charging pressure is higher than the target charging pressure, in order to reduce the throttle valve opening, the controllability and the response may be degraded. Thus, an increase in the retard amount of the first intake valve 54A reduces the air amount as much as the increased amount by increasing the charging pressure. This maintains the controllability and the responsiveness. Such a control has an advantage in the pump loss.

Next, a description will be given of various matters to be considered in the throttle valve closing control (step S3). Additionally, these matters will be individually described for convenience of description, but a control may be performed in consideration of plural matters at the same time.

(Exhaust Pressure)

Figure 10:
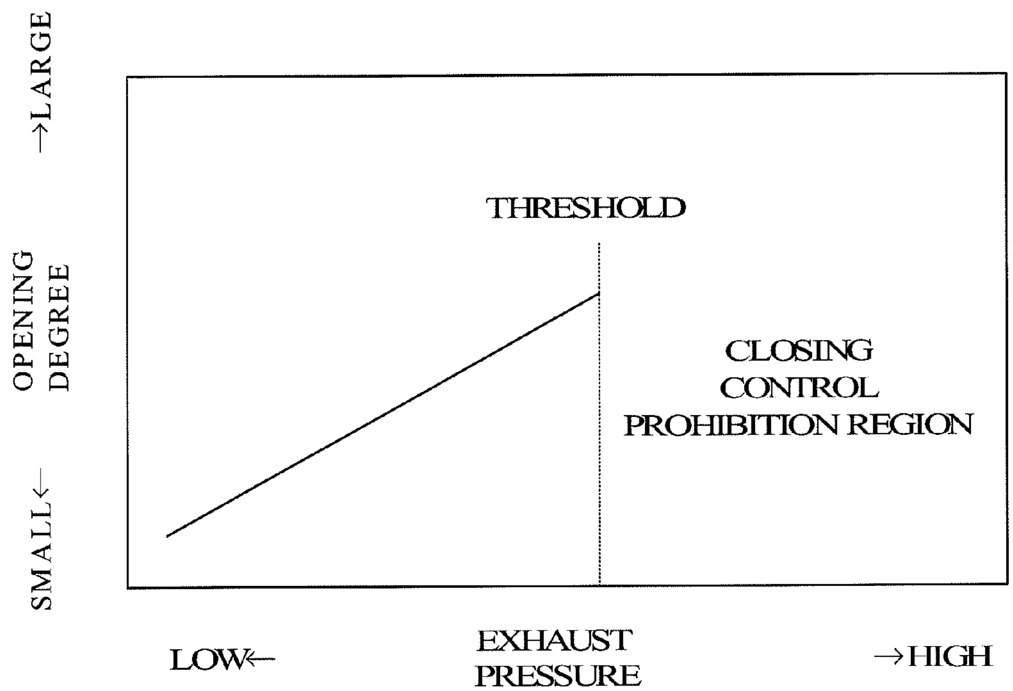
FIG. 10 is an example of a map defining a relationship between an exhaust pressure and a throttle valve opening degree.

The ECU 1 can consider the exhaust pressure of the engine 50 in the throttle valve closing control (step S3). FIG. 10 is an example of a map defining a relationship between the exhaust pressure and the throttle valve opening degree. The ECU 1 increases the opening degree of the throttle valve 60 as the exhaust pressure of the engine 50 is higher. In other words, the reduction degree of the throttle valve 60 is reduced. Further, the ECU 1 suppresses or prohibits the throttle valve closing control from being performed, when the exhaust pressure of the engine 50 is a preset determined value or higher.

When the exhaust pressure is high, the reduction degree of the opening of the throttle valve 60 is increased to reduce the pressure on the downstream side of the throttle valve 60, thereby further increasing the pressure difference between the upstream and downstream sides of the EGR valve 62. An increase in the pressure difference between the upstream and downstream sides of the EGR valve 62 degrades the EGR controllability as mentioned above. Thus, when the exhaust pressure is high, the opening degree of the throttle valve 60 is increased to maintain the high pressure on the intake pipe in the downstream side of the throttle valve 60. This maintains the EGR controllability. When the exhaust pressure is higher than a threshold, the closing control is prohibited, and then the throttle valve 60 is fully opened.

(Engine Rotational Number and Engine Load)

Figure 11:
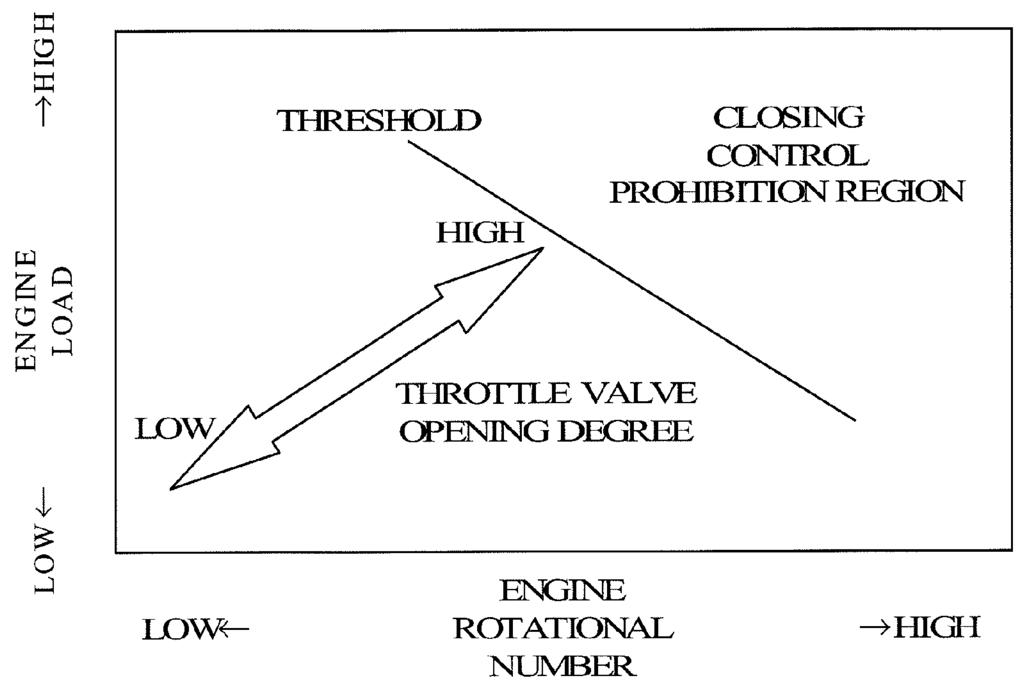
FIG. 11 is an example of a map defining a relationship between an engine rotational number and an engine load, and the throttle valve opening degree.

The ECU 1 can consider the rotational number and the load of the engine 50 in the throttle valve closing control (step S3). FIG. 11 is an example of a map defining a relationship between the engine rotational number and the engine load, and the opening degree of the throttle valve 60. The ECU 1 increases the opening degree of the throttle valve 60 as the rotational number and the load of the engine 50 are higher, and suppresses or prohibits the closing control of the throttle valve 60 when the engine 50 is in the high rotation and high load state (the rotational number and the load are higher than preset thresholds).

The drivability is further degraded in reducing the torque by the throttle valve closing control as the rotational number and the load of the engine 50 are higher. In such a case, the reduction degree of the throttle valve opening is suppressed to increase the opening of the throttle valve 60. The closing control is prohibited to fully open the throttle valve 60, when the rotational number and the load are respectively higher than thresholds. This suppresses the drivability degradation.

Figure 12:
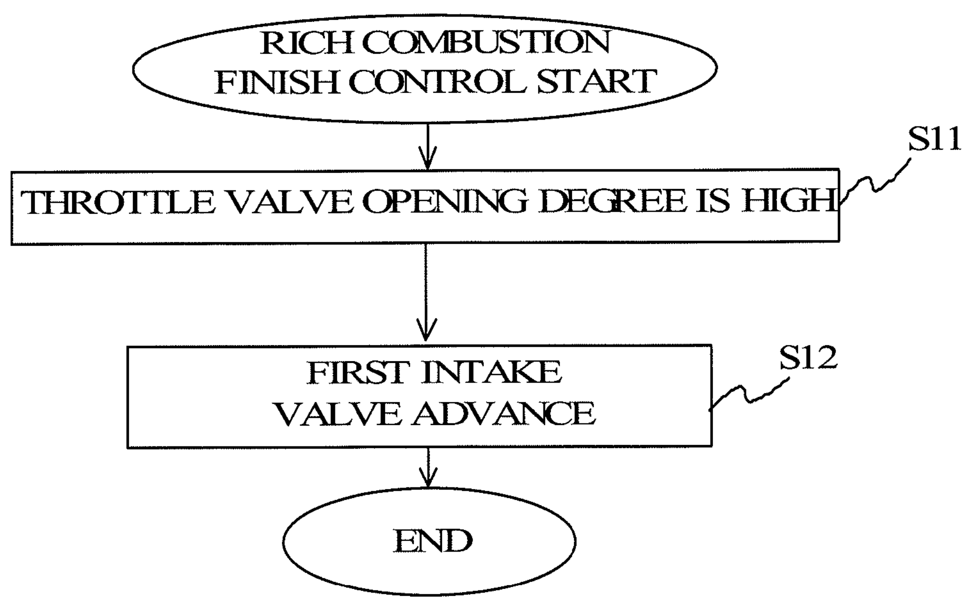
FIG. 12 is an example of a flowchart when a rich combustion state is finished.

Next, a description will be given of control to finish the rich combustion. When the ECU 1 determines that the rich combustion state should be finished, the ECU 1 finishes the rich combustion state (rich spike) in accordance with a flowchart illustrated in FIG. 12. Firstly, the reduced opening of the throttle valve 60 is increased in step S11. After that, the first intake valve advances in step S12. The steps are performed in such an order, thereby suppressing the generation of the chalk in the throttle valve 60. This results in suppressing the pump loss, the fuel consumption, and the drivability degradation.

As mentioned above, the control apparatus of the engine of the embodiment suppresses the generation of the smoke, and improves the responsiveness of the rich combustion.

Second Embodiment

Figure 13:
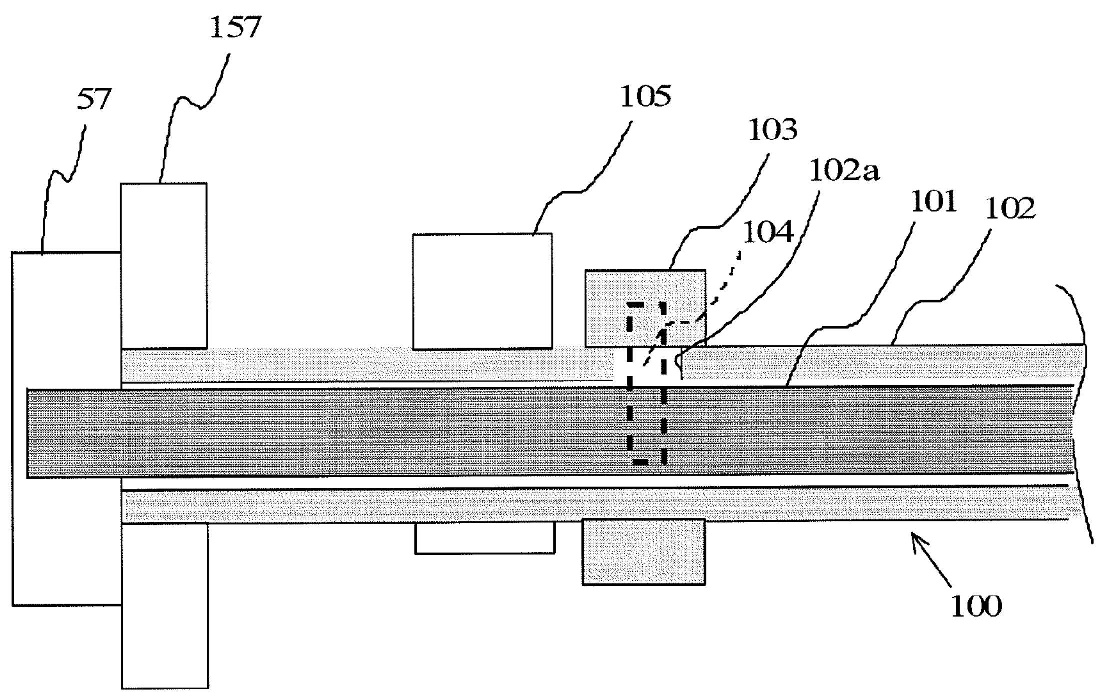
FIG. 13 is an explanatory view of an example of an intake camshaft of a second embodiment.
Figure 14:
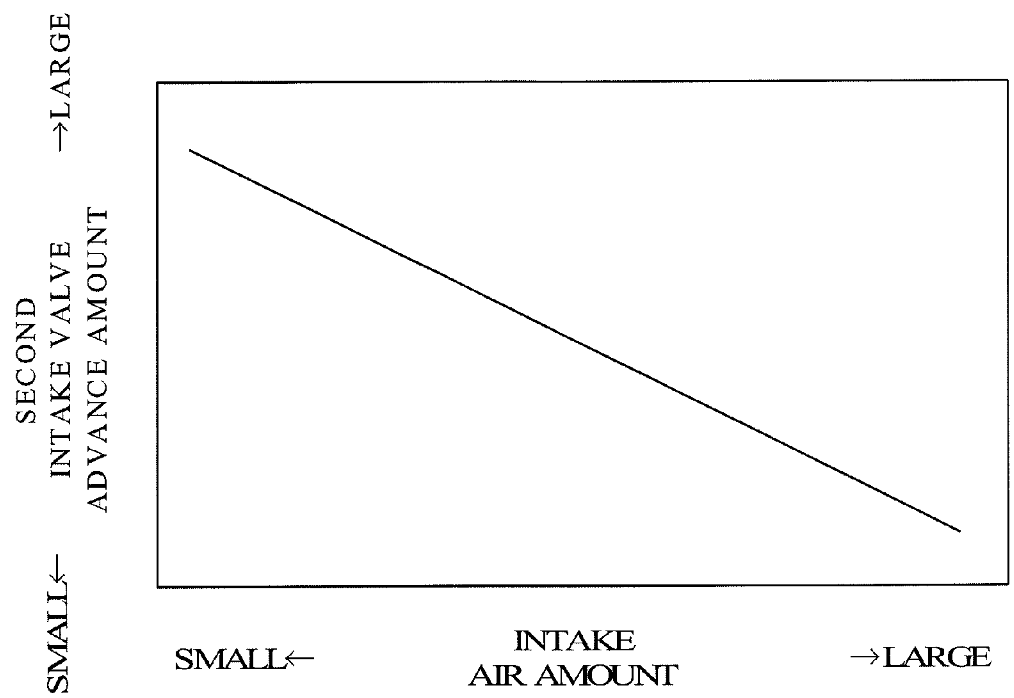
FIG. 14 is an example of a map defining a relationship between an intake air amount and an advance amount.

Next, a second embodiment will be described with reference to FIGS. 13 and 14. The second embodiment is different from the first embodiment in that the second embodiment includes an intake VVT 157 corresponding to a second phase changing portion changing a phase of the second intake valve 54B. The intake VV T157 is installed into the outer shaft 102 as illustrated in FIG. 13. Thus, the intake VVT 157 changes the phase of the second intake valve 54B driven by the second cam 105 press-fitted onto the outer shaft 102. The ECU 1 performs a retard control which controls the intake VVT 57 to retard the first intake valve 54A, and performs advance control which controls the intake VVT 157 to advance the second intake valve 54B.

In such a way, the phase difference is increased to strengthen the swirl flow. This results in further suppressing the generation of the smoke.

When the second intake valve 54B is advanced in such a way, the ECU 1 further advances the second intake valve 54B as the intake air amount is smaller. FIG. 14 is an example of a map defining a relationship between the intake air amount and the advance amount of the second intake valve 54B. When the intake air amount in the cylinder 51*a* is small, the intake air has a small inertia force. Thus, the phase difference between the first and second intake valves is increased to strengthen the swirl flow. This results in suppressing the generation of the smoke.

In this way, in the case where the advance control of the second the intake valve 54B has been performed, when the ECU 1 finishes the rich combustion state, the ECU 1 increases the opening degree of the throttle valve 60, and then retards the advanced second intake valve 54B to return to an initial state. Specifically, in step S11 illustrated in FIG. 12, the first intake valve 54A advances and the second intake valve 54B retards to finish the rich combustion state.

Accordingly, the second intake valve 54B advances to suppress the generation of the smoke.

Third Embodiment

Figure 15:
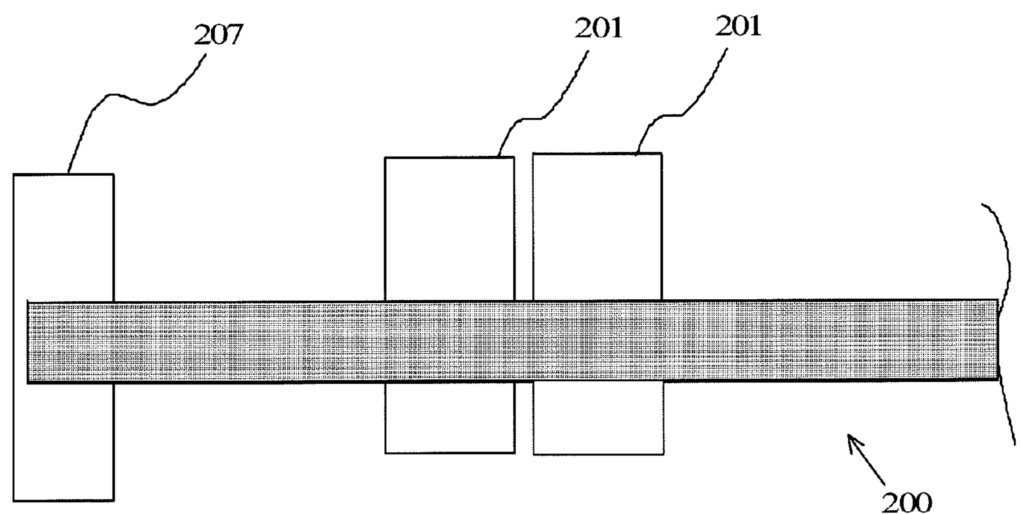
FIG. 15 is an explanatory view of an example of an exhaust camshaft.
Figure 16:
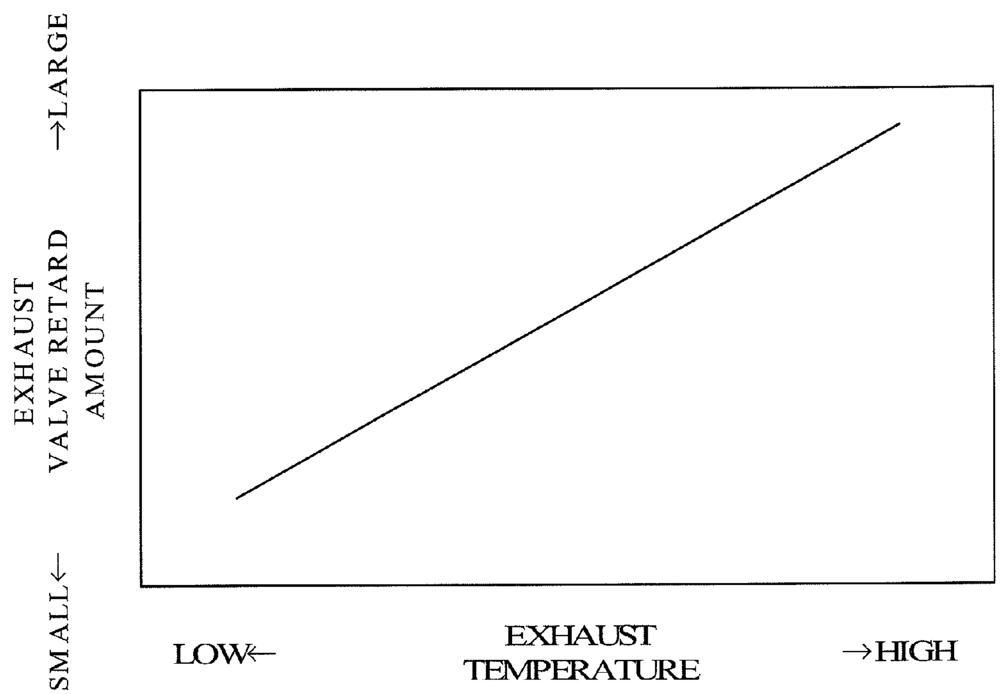
FIG. 16 is an example of a map defining a relationship between the exhaust temperature and a retard amount of the exhaust valve.

Next, a third embodiment will be described with reference to FIGS. 15 and 16. The third embodiment is different from the first embodiment in that the third embodiment includes an exhaust VVT 207 corresponding to a third phase changing portion changing phases of the exhaust valves 55. The exhaust VVT 207 is installed into an exhaust camshaft 200 press-fitted into exhaust cams 201 driving the exhaust valves 55 as illustrated in FIG. 15. The configuration of the exhaust VVT 207 is the same as the intake VVT 57, and a detail description of thereof is omitted. FIG. 16 is an example of a map defining a relationship between the exhaust temperature and the retard amount of the exhaust valve 55. The ECU 1 controls the exhaust VVT 207 to further retard the exhaust valve 55 as the exhaust temperature is higher. The exhaust loss reduces and the workload of the supercharger 30 reduces to suppress an increase in the charging pressure. An increase in the charging pressure is suppressed to reduce the air amount introduced into the cylinder 51*a*. In such control for suppressing an increase in the charging pressure to reduce the air amount, there is an advantage in the controllability, the responsiveness, and the pump loss, as compared to a case where the throttle valve opening is reduced.

While the exemplary embodiments of the present invention have been illustrated in detail, the present invention is not limited to the above-mentioned embodiments, and other embodiments, variations and modifications may be made without departing from the scope of the present invention.

DESCRIPTION OF LETTERS OR NUMERALS

1 . . . ECU
30 . . . supercharger
50 . . . engine
54A . . . first intake valve
54B . . . second intake valve
55 . . . exhaust valve
57, 157 . . . intake side VVT
60 . . . throttle valves
61 . . . EGR pipe
62 . . . EGR valve
100 . . . intake cam shaft
200 . . . exhaust camshafts
207 . . . exhaust side VVT

The invention claimed is:

1. A control device for an engine of a cylinder fuel injection type, the control apparatus comprising:

a first phase changing portion retarding a first intake valve phase relative to a second intake valve phase, a second phase changing portion changing the second intake valve phase, a throttle valve adjusting an intake air amount of the engine, and a control portion configured to perform a retard control in which the first phase changing portion is controlled to retard the first intake valve phase relative to the second intake valve phase and perform an advance control in which the second phase changing portion is controlled to advance the second intake valve phase such that an air amount in the cylinder of the engine is reduced to a target value to perform rich combustion, and the control portion configured to perform a throttle valve closing control in which the throttle valve is controlled such that the air amount in the cylinder is the target value or smaller and the rich combustion is performed after performing an intake valve phase control that is performed by controlling the first phase changing portion and the second phase changing portion when the air amount in the cylinder cannot be reduced to the target value or smaller by performing the intake valve phase control.

2. The control device for the engine of claim 1, wherein the control portion is configured to further advance the second intake valve as an actual value of an intake air amount is smaller.

3. The control device for the engine of claim 1, wherein the control portion is configured to consider an exhaust pressure of the engine and suppress the throttle valve closing control, when an exhaust pressure is a predetermined value or higher in the throttle valve closing control.

4. The control device for the engine of claim 1, wherein the control portion is configured to consider an exhaust pressure of the engine and increase the throttle valve opening as an exhaust pressure of the engine is higher in the throttle valve closing control.

5. The control device for the engine of claim 1, wherein the control portion is configured to consider a rotation number of the engine and a load of the engine and suppress the throttle valve closing control, when the engine is in a high rotational and high load state in the throttle valve closing control.

6. The control device for the engine of claim 1, wherein the control portion is configured to consider a rotation number of the engine and a load of the engine and increase the throttle valve opening as a rotational number and a load of the engine are higher in the throttle valve closing control.

7. The control device for the engine of claim 1, wherein the control portion is configured to consider an exhaust temperature of the engine and further retard the first intake valve phase as an exhaust temperature is higher in the intake valve phase control.

8. The control device for the engine of claim 1, further comprising a supercharger, wherein the control portion is configured to consider a charging pressure in the engine and further retard the first intake valve phase, when a charging pressure of the supercharger is higher than a target charging pressure in the intake valve phase control.

9. The control device for the engine of claim 8, further comprising a third phase changing portion changing an exhaust valve phase, wherein the control portion is configured to control the third phase changing portion to retard the exhaust valve as an exhaust temperature is higher.

10. The control device for the engine of claim 1, wherein the control portion is configured to increase the throttle valve opening, and then advance the retarded first intake valve, when finishing the rich combustion.

11. The control device for the engine of claim 1, wherein the control portion is configured to increase the throttle valve opening, and then retards the advanced second intake valve, when finishing the rich combustion.

* * * * *